(12) United States Patent
Markow

(10) Patent No.: US 6,978,199 B2
(45) Date of Patent: Dec. 20, 2005

(54) METHOD AND APPARATUS FOR ASSISTING VEHICLE OPERATOR

(75) Inventor: Paul A Markow, Huntsville, AL (US)

(73) Assignee: DaimlerChrysler Corporation, Auburn Hills, MI (US)

(*) Notice: Subject to any disclaimer, the term of this patent is extended or adjusted under 35 U.S.C. 154(b) by 529 days.

(21) Appl. No.: 10/342,922

(22) Filed: Jan. 15, 2003

(65) Prior Publication Data

US 2004/0139084 A1 Jul. 15, 2004

(51) Int. Cl.[7] .......................................... G06F 17/00
(52) U.S. Cl. .......................... 701/36; 701/1; 701/35; 707/102; 715/700
(58) Field of Search ................. 701/1, 35, 36; 707/100, 102, 104.1; 715/500, 700; 340/438, 340/457, 825.25

(56) References Cited

U.S. PATENT DOCUMENTS

| | | | | |
|---|---|---|---|---|
| 5,214,707 A | * | 5/1993 | Fujimoto et al. | 704/275 |
| 5,525,977 A | * | 6/1996 | Suman | 340/825.25 |
| 5,949,345 A | * | 9/1999 | Beckert et al. | 340/815.41 |
| 6,023,290 A | * | 2/2000 | Seita | 348/118 |
| 6,249,720 B1 | * | 6/2001 | Kubota et al. | 701/1 |
| 6,580,973 B2 | * | 6/2003 | Leivian et al. | 701/1 |

* cited by examiner

Primary Examiner—Tan Q. Nguyen
(74) Attorney, Agent, or Firm—Ralph E. Smith

(57) ABSTRACT

A vehicle operator assistance system includes a user interface adapted to accept a user request for explanatory information relating to a particular vehicle operation, and to communicate explanatory information relating to the particular vehicle operation to a user. It further includes a data store of explanatory information relating to a plurality of vehicle operations. An information retrieval module is adapted to retrieve explanatory information relating to the particular vehicle operation from the data store based on the user request, and to communicate the explanatory information relating to the particular vehicle operation to the user via the user interface. The user interface has a user request input permitting the user to initiate a request for explanatory information relating to a particular vehicle operation input by utilizing the user request input and the particular vehicle operation input in a predetermined fashion.

24 Claims, 3 Drawing Sheets

METHOD AND APPARATUS FOR ASSISTING VEHICLE OPERATOR

FIELD OF THE INVENTION

The present invention generally relates to vehicle operation assistance methods and systems, and particularly relates to automated communication of assistive media based on utilization of a corresponding vehicle input.

BACKGROUND OF THE INVENTION

Today's automobiles exhibit increasing complexity of design in terms of added features and related user interface mechanisms. Increase in the number of vehicle inputs, combined with limited space in vehicles, results in reduced opportunity to adequately label all of the inputs and explain associated functions. Also, diverse designs for similar inputs, combined with similar designs for diverse inputs, leads to confusion, even among experienced vehicle operators, as to functions associated with new inputs for new features, as to functions associated with new inputs for old features, and as to functions associated with old inputs for old features where new inputs are similar in appearance to the old inputs. This confusion is further compounded for less experienced vehicle operators, such as new drivers and experienced drivers of an unfamiliar vehicle model.

Vehicle operators trying to identify vehicle operation inputs can, in some cases, consult a manual, but may not know a name to use in a provided index, and/or may have difficulty identifying a component on a provided illustration. Also, vehicle operators experimentally utilizing inputs in an attempt to determine their associated functions may accidentally trigger an undesired function (horn, alarm, etc.), or be unable to identify the function under the test conditions (fog lights in the day, windshield defrost in the summer, etc.). Further, even where a function is identified, a vehicle operator may experience difficulty utilizing the function properly, and may still not know the correct name for indexing the function in a manual.

Today's vehicles, therefore, suffer from the inability to quickly and easily provide vehicle operators with explanatory information, such as function and/or instructions for use, associated with a functional input. Today's vehicles can further benefit from provision of an instruction tool that instructs users on performance of vehicle related tasks, particularly in association with vehicle maintenance and proper response to an emergency situation. Therefore, there is a need for a vehicle operator system and method that can quickly and easily provide vehicle operators with explanatory information relating to vehicle functions and vehicle related tasks. The present invention fulfills the aforementioned need.

SUMMARY OF THE INVENTION

A vehicle operator assistance system includes a user interface adapted to accept a user request for explanatory information relating to a particular vehicle operation, and to communicate explanatory information relating to the particular vehicle operation to a user. It further includes a data store of explanatory information relating to a plurality of vehicle operations. An information retrieval module is adapted to retrieve explanatory information relating to the particular vehicle operation from the data store based on the user request, and to communicate the explanatory information relating to the particular vehicle operation to the user via the user interface. The user interface has a user request input permitting the user to initiate a request for explanatory information relating to a particular vehicle operation input of a vehicle by utilizing the user request input and the particular vehicle operation input in a predetermined fashion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, the present invention is particularly described herein with reference to a preferred embodiment employing a digital storage disc and a digital storage disc player in an automobile. It should be readily understood, however, that the present invention can be employed with various types of data stores and data retrieval mechanisms in various types of vehicles.

Figure 1:
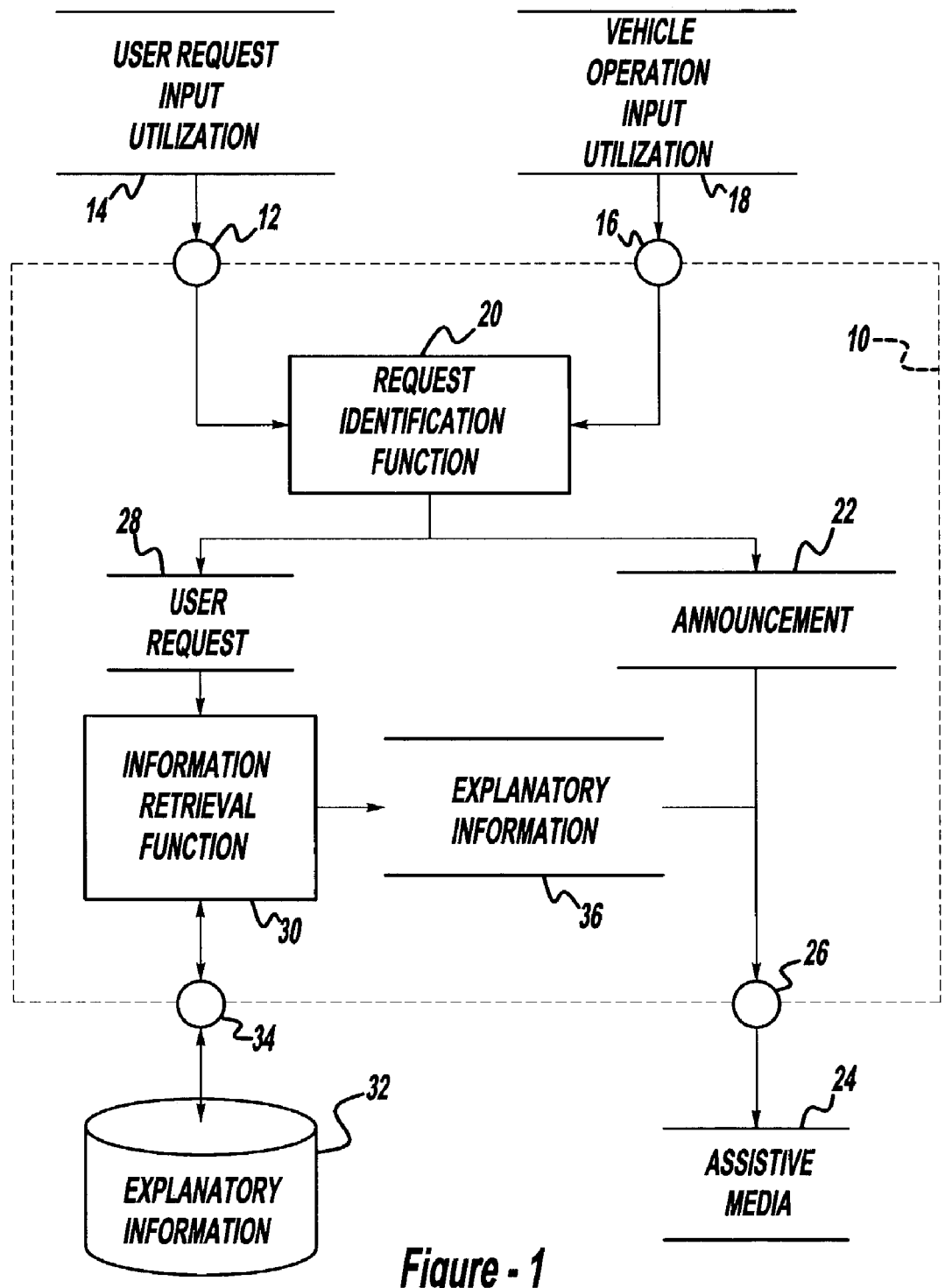
FIG. 1 is a block diagram of a vehicle operator assistance system according to the present invention.

The system according to the present invention is shown in FIG. 1. The system 10 has a user interface including a dedicated user request input 12 detecting user request input utilization 14, and an input 16 receptive of a signal indicating vehicle operation input utilization 18. A request identification function 20 identifies a user request 28 for explanatory information relating to a particular vehicle operation input based on detection of the user request input utilization 14, and subsequent, timely receipt of the signal indicating vehicle operation input utilization 18.

In a preferred embodiment, detection of user request input utilization 14 prompts issuance of announcement 22, which includes information that the next input utilization (button pressed) will cause an appropriate explanation relating to the input to be communicated to the user. Announcement 22 is communicated to the user as assistive media 24 via media output 26 (speakers and/or active display). Request identification function 20 then enters a request state awaiting receipt of the signal indicating vehicle operation input utilization 18. This state times out after a predetermined amount of time, and/or after the signal is received. During this state, manipulation of the next vehicle operation input does not necessarily cause an associated function (such as horn or alarm) to execute, but causes system 10 to identify a user request for information relating to the particular vehicle operation.

Once user request 28 is identified, information retrieval function 30 accesses data store 32 via data link 34 and retrieves appropriate explanatory information 36 based on user request 28. The form of data store 32 can vary depending on available technology and shifting market forces. For example, if the vehicle is provided with a wireless data link 34 (telematics, wireless, etc.), data store 32 can be an online database accessible over the Internet and organized into files operable to relate explanatory information pertaining to particular vehicle operations. Also, if the vehicle is provided with a large embedded memory (hard drive, flash memory, etc.), then data store 32 can be embedded memory organized into files and/or sectors operable to relate explanatory information pertaining to particular vehicle operations. Further, if the vehicle is provided with a digital storage disc player (DVD player, CD player, etc.), then data store 32 can take the form of a digital storage disc (DVD, CD, etc.) organized into tracks operable to relate explanatory information pertaining to particular vehicle operations. In further embodiments, announcement 22 can also be a file, sector, and/or track of data store 32. Accordingly, information retrieval function 30 has an index and/or map and associated information retrieval functions specific to the type of data store 32 and input/output 34. Explanatory information 36, like announcement 22, is also communicated to the vehicle operator as auditory and or visual assistive media 24.

Figure 2:
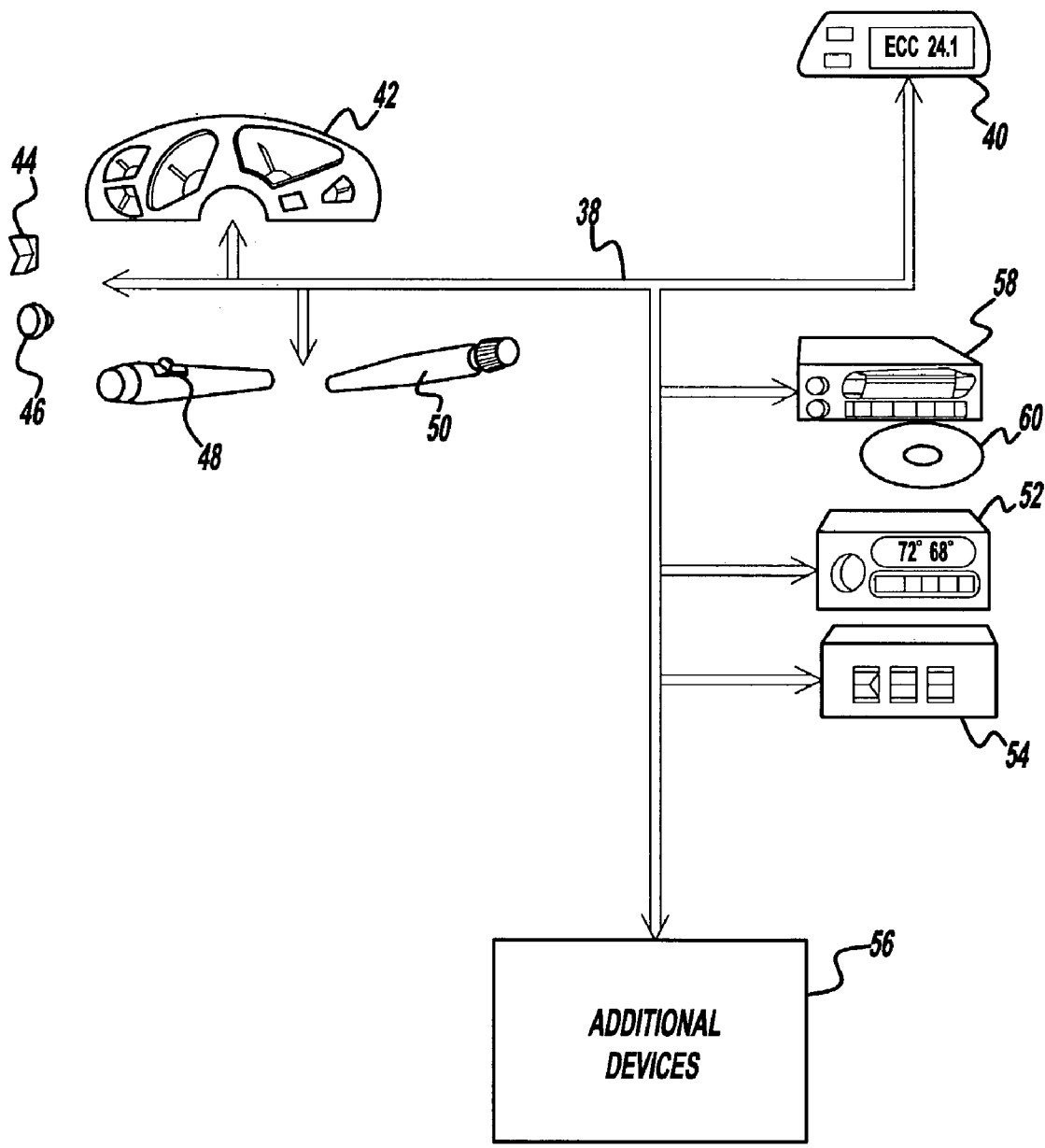
FIG. 2 is an electronic schematic for a vehicle interface according to the present invention.

The system of the present invention is adapted to integrate other systems of a vehicle into its operation as further discussed with reference to FIG. 2. Therein, various vehicle operation inputs are connected to a vehicle data bus 38 (CCD, J1850, CAN, etc.) to form a user interface for both the vehicle and the system of the present invention. Various functional inputs permitting the user to operate the vehicle include overhead console 40, vehicle dash 42 (trip meter, odometer, etc.), fog lamp switch 44, headlamp pull-button 46, cruise control dial 48, wiper control lever and dial 50, climate controller 52 (heat, air conditioning, etc.), and windshield device controller 54 (rear wiper, rear defrost, etc.). Additional devices 56 include a cell phone link, navigation system, telematics, voice recognition, vehicle fault detection system, speakers, active display, and an electronic control unit (ECU) for controlling the vehicle according to various received bus signals generated by user input. Also, radio/CD player 58 is connected to vehicle bus 38 and, in one embodiment, comprises at least part of the user interface and retrieval module of the present invention.

An embodiment of the present invention implementing a radio/CD player as a central component envisions use of a CD as a data store for explanatory information organized into tracks operable to relate explanatory information pertaining to particular vehicle operations. A dedicated user request button is provided, for example, to radio/CD player 58, but can alternatively be connected to data bus 38 independently, or integrated into another device comprising the user interface. A user placing the CD into the CD player 58 and pressing a button corresponding to the user request input causes CD player 58 to enter the request state. If the user request input (not shown) is provided to CD player 58, then CD player 58 issues a bus signal to the ECU, which is adapted in response, to ignore subsequent bus signals from various, designated, vehicle operation inputs. Alternatively, if the user request input (not shown) is connected to data bus 38 directly or through another device, then the signal received by CD player 58 can also be received by the ECU and cause the ECU to respond accordingly.

When CD player 58 enters the request state, it plays an announcement track from CD 60 over speakers of additional devices 56. It also waits a predetermined amount of time and, if not timely receiving a subsequent data bus signal, exits the request state and sends another signal to the ECU, which is adapted to return to normal operation in response.

Alternatively, ECU can time out on its own. If, however, CD player 58 timely receives a bus signal caused by utilization of one of the vehicle operation inputs, then CD player 58 identifies the user request for explanatory information relating to the utilized vehicle operation input and exits the request state. The ECU also exits the request state, either responding to a bus signal from the utilized vehicle operation input, or from CD player 58. Once CD player 58 identifies the user request for information relating to the utilized vehicle operation input, it uses a lookup table, index, or other software data structure to identify a corresponding audio and/or video track of CD 60. It then selects to play the identified track via speakers of additional devices 56.

According to further embodiments of the system of the present invention, some tracks of CD 60 relate to vehicle operations that correspond to tasks associated with vehicle operation, rather than to functions associated with functional inputs permitting the user to operate the vehicle. Enabling vehicle operators to indicate a request for information relating to these tasks requires inclusion of non-functional inputs not permitting the user to operate the vehicle. These non-functional inputs essentially allow vehicle operators to identify a vehicle-related task not having a corresponding functional input. Form and presentation of these inputs can vary, but a preferred embodiment envisions implementation of a menu display.

A menu display of non-functional inputs can be implemented via an active display of additional devices 56, or provided, for example, to data storage medium player 58. The contents of the displayed menu can include topics relating to vehicle maintenance (changing a tire, changing oil, etc.) and/or vehicle emergency response (evacuation routes and protocols, driving in flood conditions, etc.), and can also include the topics relating to the functional inputs. The menu contents can be data store specific, such as with extraction of titles of data tracks, and can thus change with insertion of a new data storage medium. A map for selecting a corresponding data track, for both functional and non-functional inputs, can also be built each time a new data storage medium is inserted. The menu contents can further be managed/prioritized in view of bus signals received by an automatic fault detection system of additional devices 56, and/or information (news, weather) provided by telematics of additional devices 56. Accordingly, detection of low oil causes display of a menu item for retrieving information relating to oil changes. Similarly, a received flood alert causes display of a menu item relating to vehicle operation in flood conditions.

Additionally, menu contents can be used to constrain recognized speech for a voice recognizer of additional devices 56, and the menu contents can be managed/prioritized and/or selected by speech in this manner. This functionality, along with the menu contents extraction and map building, can be incorporated from a speech selection functionality also implemented to select tracks of, for example, music CDs. The user request input can further be implemented with speech recognition, but utilization of functional inputs remains preferred because a vehicle operator trying to identify an input will generally not know the correct name by which to call the unidentified input mechanism.

Figure 3:
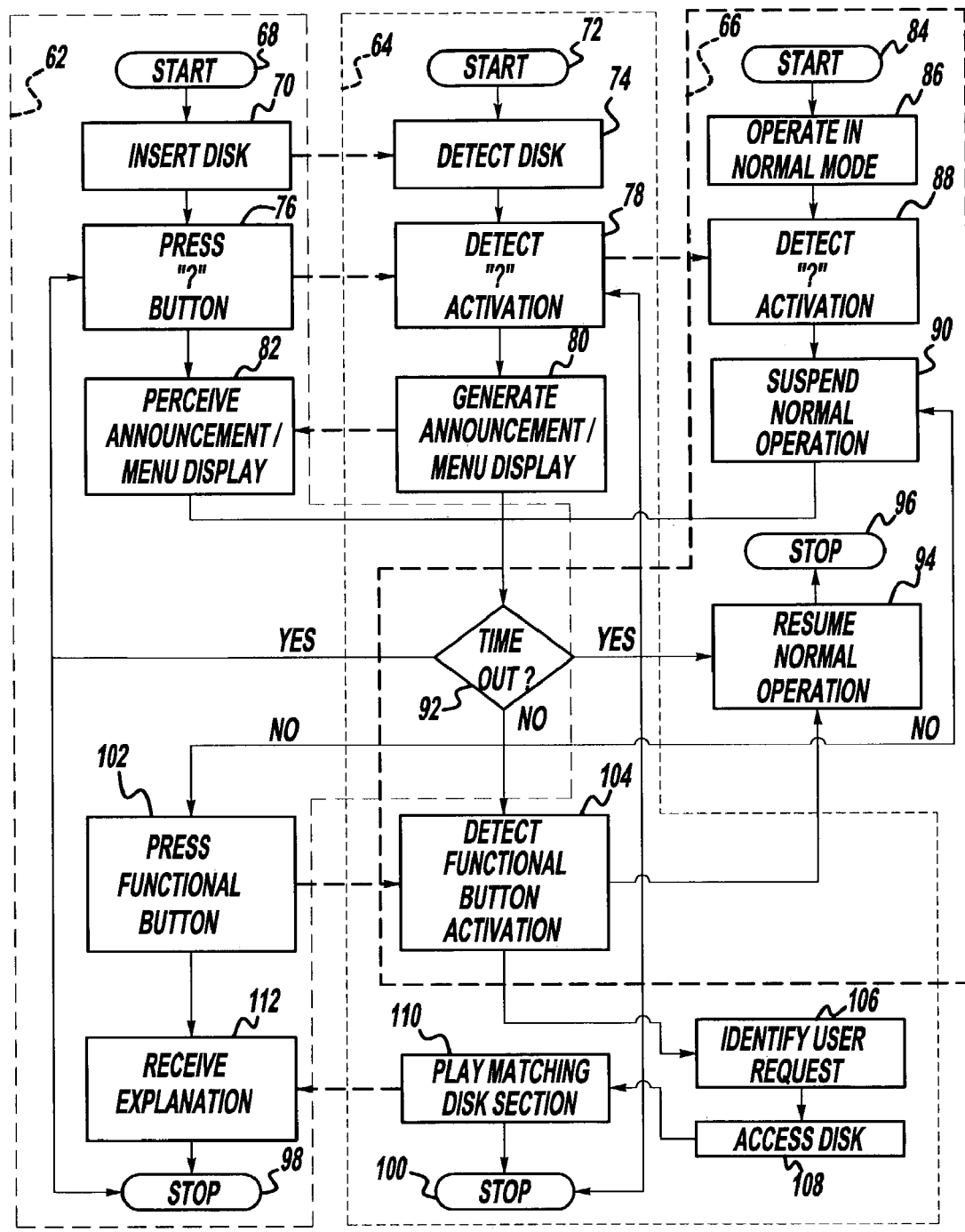
FIG. 3 is a flow diagram depicting a method of vehicle operator assistance according to the present invention.

The method of the present invention is illustrated in FIG. 3 as three parallel methods with interrelated and/or shared steps. For example, method 62 focuses on steps performed by a vehicle operator using the system according to the present invention. Also, method 64 focuses on steps performed by the system according to the present invention. Further, method 66 focuses on steps performed by a vehicle ECU according to the present invention. These methods interrelate and share steps to accomplish the method of the present invention.

Method 62 begins at 68 and commences with step 70, wherein a vehicle operator inserts a digital memory disc into a disc player of the vehicle. In an interrelated fashion, method 64 begins at 72 and commences with detection in step 74 of the inserted disc. Step 74 may include building of a title index by which to access tracks based on bus signals, and precise sub steps may vary depending on particular implementations. For example, track names may include corresponding bus signal information. Similarly, track names may be keyword titles of functions, and the disc player may have a lookup table for finding a keyword function title based on a received bus signal. Alternatively, the disc can have an index stored on it that the disc player is adapted to access each time it selects a track based on a bus signal. In any case, method 62 proceeds to step 76, wherein the vehicle operator initiates the user request by pressing the user request button, speaking a user request keyword inquiry, or performing a similar action causing method 64 to detect initiation of the keyword request at step 78 in accordance with the manner of user request initiation, and enter the request state. Entrance of the request state causes generation of an announcement/menu display at step 80 which is perceived by the vehicle operator at step 82.

Method 66 is related to methods 62 and 64. Beginning at 84, the ECU processes in normal mode at step 86 by performing an associated vehicle function upon receipt of a bus signal caused by utilization of a functional input. However, when method 66 detects the user request at step 88 in response to receipt of a bus signal initiated in step 76 and/or step 78, method 66 suspends normal operation at step 90. During suspension of normal operation at step 90, the ECU does not perform associated vehicle functions upon receipt of bus signals caused by utilization of a functional input for some or all vehicle functions. For example, critical vehicle functions (vehicle ignition, brakes, steering, etc.) may continue to function normally as if the ECU were still operating in normal mode; critical functions may bypass the ECU, may not be included in the user interface of the system of the present invention, and/or the ECU may selectively suspend normal operation. Also, other vehicle functions (windshield wipers, headlights, etc.) may continue to function in a manner indicated by user interface settings in existence prior to suspension of normal operation at step 86. Thus, windshield wipers, for example, may continue to traverse a windshield if already doing so when a vehicle operator initiates a user request at step 76, and will then continue to do so even if the vehicle operator turns off the wipers during suspension of normal operation at step 86.

If the user request times out at 92, then method 66 resumes normal operation at step 94 and ends at 96, and methods 62 and 64 respectively end at 98 and 100, and/or return to steps 76 and 78, respectively. If, however, the user request does not time out before the vehicle operator initiates the user request at step 102, then the user input utilization is detected at step 104 in method 64 and method 66. This user input utilization detection at step 104, in turn, causes method 66 to resume normal operation at step 94 and end at 96. The detection of user input utilization at step 104 further causes method 64 to identify the user request at step 106 based on the bus signal timely received subsequent to detection of the user request at step 78. The disc player then retrieves the explanatory information by selecting a corresponding disc section, accessing the disc at step 108, and playing the matching disc section at step 110. The vehicle operator, in turn, receives the explanatory information at step 112 by hearing and/or seeing the played disc section. Methods 62 and 64 then end at 98 and 100, respectively.

The description of the invention is merely exemplary in nature and, thus, variations that do not depart from the gist of the invention are intended to be within the scope of the invention. For example, the present invention is particularly described herein with reference to a preferred embodiment employing a digital storage disc and a digital storage disc player in an automobile. The present invention, however, can be employed with various types of data stores and data retrieval mechanisms in various types of vehicles. It should be readily understood that the systems and methods of the present invention can be modified to accommodate more, less, and/or alternative vehicle components and/or steps based on available technology, shifting market forces, and/or particular implementations of the system and method of the present invention. Such variations are not to be regarded as a departure from the spirit and scope of the invention.

What is claimed is:

1. A vehicle operator assistance system, comprising:
   a user interface adapted to accept a user request for explanatory information relating to a particular vehicle operation, and to communicate explanatory information relating to the particular vehicle operation to a user;
   a data store of explanatory information relating to a plurality of vehicle operations; and
   an information retrieval module adapted to retrieve explanatory information relating to the particular vehicle operation from said data store based on the user request, and to communicate the explanatory information relating to the particular vehicle operation to the user via said user interface,
   wherein said user interface has a user request input permitting the user to initiate a request for explanatory information relating to a particular vehicle operation input of a vehicle by utilizing the user request input and the particular vehicle operation input in a predetermined fashion.

2. The system of claim 1, wherein the predetermined fashion includes utilization of the user request input and the particular vehicle operation input in a predetermined sequence.

3. The system of claim 2, wherein the predetermined fashion includes utilization of the user request input and the particular vehicle operation input within a predetermined time interval.

4. The system of claim 3, wherein said information retrieval module is adapted to detect utilization of the user request input and, within the predetermined time interval, detect subsequent utilization of the particular vehicle operation input, thereby identifying the user request for explanatory information relating to the particular vehicle input.

5. The system of claim 1, wherein the user request input corresponds to a dedicated user input mechanism responsive to physical manipulation by the user.

6. The system of claim 1, wherein said user interface has a plurality of vehicle operation inputs including a functional input permitting the user to operate the vehicle, and including a non-functional input allowing the user to identify a vehicle-related task not having a corresponding functional input.

7. The system of claim 1, wherein said data store corresponds to a digital storage disk, and said information retrieval module includes a digital storage disk player.

8. The system of claim 1, wherein said data store corresponds to embedded memory of a vehicle, and said information retrieval module corresponds to an electronic control unit operating the vehicle.

9. The system of claim 1, further comprising a wireless data link, wherein said data store corresponds to a networked data store accessible via said wireless link.

10. The system of claim 1, wherein said user interface has an audio output adapted to communicate the explanatory information to the user as audible media.

11. The system of claim 1, wherein said user interface has a video output adapted to communicate the explanatory information to the user as visual media.

12. A method for providing assistance to a vehicle operator, comprising:
   detecting utilization of a user request input;
   detecting utilization of a particular vehicle operation input of a vehicle;
   identifying a user request for explanatory information relating to a particular vehicle operation based on utilization of the user request input and the particular vehicle operation input;
   retrieving explanatory information relating to the particular vehicle operation based on the user request; and
   communicating explanatory information relating to the particular vehicle operation to the user.

13. The method of claim 12, wherein said step of identifying the user request includes identifying the user request based on proximity in time relating to said step of detecting utilization of the user request input, and said step of detecting utilization of a particular vehicle operation input.

14. The method of claim 13, wherein said step of identifying the user request includes identifying the user request based on a sequence relating to said step of detecting utilization of the user request input, and said step of detecting utilization of a particular vehicle operation input.

15. The method of claim 14, wherein said step of identifying the user request includes identifying the user request based on said step of detecting utilization of the user request input immediately preceding said step of detecting utilization of a particular vehicle operation input within a predetermined time interval.

16. The method of claim 12, wherein said step of detecting utilization of a user request input includes receiving a vehicle bus signal generated by physical user manipulation of a dedicated user request input.

17. The method of claim 12, wherein said step of detecting utilization of a vehicle operation input includes receiving a vehicle bus signal generated by physical user manipulation of a functional input operable to permit the user to operate the vehicle.

18. The method of claim 12, wherein said step of detecting utilization of a vehicle operation input includes receiving a vehicle bus signal generated by physical user manipulation of a non-functional input allowing the user to identify a vehicle-related task not having a corresponding functional input.

19. The method of claim 12, wherein said step of retrieving explanatory information includes reading a digital storage disk via a digital storage disk player.

20. The method of claim 12, wherein said step of retrieving explanatory information includes accessing embedded memory of a vehicle via an electronic control unit operating the vehicle.

21. The method of claim 12, wherein said step of retrieving explanatory information includes accessing a networked data store via a wireless link.

22. The method of claim 12, wherein said step of communicating explanatory information includes communicating the explanatory information to the user as audible media.

23. The method of claim 12, wherein said step of communicating explanatory information includes communicating the explanatory information to the user as visual media.

24. A vehicle comprising:
   a data bus;
   a plurality of vehicle operation inputs operably connected to said data bus, including a functional input permitting the user to operate the vehicle;
   a dedicated user request input;
   a digital storage disk organized into tracks operable to relate explanatory information pertaining to particular vehicle operations;
   a media output device; and
   a digital storage disk player operably connected to said data bus, said dedicated user request input, and said media output device,
   wherein said digital storage disk player is adapted to identify a user request for explanatory information by detecting of utilization of said dedicated user request input, and by receiving a bus signal generated by user utilization of said functional input, and
   wherein said digital storage disk player is adapted to select a track of said digital storage disk based on the user request, and to play the selected track, thereby communicating explanatory information relating to the particular vehicle operation to the user via said media output device.

* * * * *